(12) United States Patent
Schupfner

(10) Patent No.: US 6,374,190 B2
(45) Date of Patent: Apr. 16, 2002

(54) METHOD FOR CALIBRATING AN ANGLE SENSOR AND NAVIGATION SYSTEM HAVING AN ANGLE SENSOR

(75) Inventor: Markus Schupfner, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/751,956

(22) Filed: Dec. 29, 2000

Related U.S. Application Data

(63) Continuation of application No. PCT/DE99/01810, filed on Jun. 21, 1999.

(30) Foreign Application Priority Data

Jun. 29, 1998 (DE) .......................................... 198 28 944

(51) Int. Cl.[7] ................................................ G01P 5/10
(52) U.S. Cl. ........................................ 702/94; 702/149
(58) Field of Search ............................... 702/57, 85, 87, 702/88, 92–95, 99, 97, 104, 107, 130, 133.6, 149, 150–153, 158, 183, 188, 189

(56) References Cited

U.S. PATENT DOCUMENTS

| | | | | |
|---|---|---|---|---|
| 5,272,516 A | * | 12/1993 | Ashikuza | 356/350 |
| 5,297,028 A | * | 3/1994 | Ishikawa | 702/92 |
| 5,527,003 A | * | 6/1996 | Diesel et al. | 244/195 |
| 6,085,137 A | * | 7/2000 | Aruga et al. | 701/51 |

* cited by examiner

Primary Examiner—Marc S. Hoff
Assistant Examiner—Edward Raymond
(74) Attorney, Agent, or Firm—Herbert L. Lerner; Laurence A. Greenberg; Werner H. Stemer

(57) ABSTRACT

A method for calibrating an angle sensor ascertains an output signal for a zero point and measures an associated operating temperature. The output signal and a reference signal stored for the operating temperature are used to form a new reference signal. A navigation system equipped with a temperature sensor for measuring the operating temperature of the angle sensor and with a memory for storing reference signals is also provided. The calibration method and the navigation system substantially eliminate angle sensor measurement errors attributed to temperature influences.

7 Claims, 2 Drawing Sheets

METHOD FOR CALIBRATING AN ANGLE SENSOR AND NAVIGATION SYSTEM HAVING AN ANGLE SENSOR

CROSS-REFERENCE TO RELATED APPLICATION

This application is a continuation of copending International Application No. PCT/DE99/01810, filed Jun. 21, 1999, which designated the United States.

BACKGROUND OF THE INVENTION

FIELD OF THE INVENTION

The invention relates to a method for calibrating an angle sensor which is affected by the operating temperature and to a navigation system having an angle sensor.

Inexpensive gyroscopes used in navigation systems are particularly prone to provide temperature-dependent measurement values. The output signal for a change in an angular position of 0° per time unit (zero point) can be subject to severe fluctuations during a journey on account of the temperature-dependent measurement. The temperature responses of gyroscopes are individual for each respective gyroscope and cannot be defined in a general manner for a particular type of gyroscope.

U.S. Pat. No. 5,527,003 discloses a navigation system for aircraft in which the temperature response of a gyroscope is taken into account during a direction measurement. While the aircraft is in an initial orientation on the ground, a set of direction errors is ascertained for the associated temperatures. The direction of the aircraft is then changed and direction errors are ascertained again and are deducted from the initial values in order to obtain temperature-related values. The values are interpolated on the basis of originally set temperature values.

British Patent Application No. GB 301437 A relates to a compensation of temperature errors in a gyroscope. A scaling factor is determined as a function of the temperature. The scaling for a particular temperature is calculated on the basis of a reference temperature.

From U.S. Pat. No. 5,394,333 it is known to determine separate correction factors for a position which has been determined using a GPS (Global Positioning System) sensor and using composite navigation sensors. The measure used for the correction factor is the distance between the measured position and the corresponding probable position on a digital road map. The system uses either the position ascertained using the GPS sensor or the position ascertained using composite navigation, depending on which of the two values has the lower correction factor. However, the GPS signal may not be available at all locations or may not be available in uncorrupted form. If the direction of motion is measured using an angle sensor which has temperature-related errors, then the measurement accuracy is influenced, sometimes considerably, by the changing operating temperature of the angle sensor.

U.S. Pat. No. 5,297,028 discloses measuring and storing the zero point of an angle sensor for a plurality of operating temperatures. The measured values are used to correct the temperature drift of the angle sensor. If a memory location is missing a measured value, two adjacent, stored values are interpolated.

SUMMARY OF THE INVENTION

It is accordingly an object of the invention to provide a method for calibrating an angle sensor influenced by the operating temperature and a navigation system having such an angle sensor which overcome the above-mentioned disadvantages of the heretofore-known methods and systems of this general type and which take into account a temperature response of the angle sensor on an individual basis.

With the foregoing and other objects in view there is provided, in accordance with the invention, a method for calibrating an angle sensor influenced by an operating temperature, the method includes the steps of:

ascertaining an output signal for a zero point of an angle sensor and measuring an operating temperature associated with the angle sensor;

forming a new reference signal from the output signal and from a reference signal for the zero point provided for the operating temperature;

storing the new reference signal;

recording a respective number indicating how often storage operations for reference signals have been performed for each of a plurality of temperatures;

determining an influence of the reference signal for the zero point stored for a given temperature on a formation of the new reference signal based on the respective number indicating how often the storage operations have been performed; and setting the zero point of the angle sensor by using the new reference signal.

The zero point of a gyroscope (gyro zero point) or rotation rate sensor can be established when there is no motion, for example when a vehicle is at a standstill, or by using measured values from other sensors, for example a GPS receiver and/or differential wheel sensors. In addition to the gyroscope's output signal for the zero point, the operating temperature of the angle sensor is measured indirectly or directly. The output signal for the zero point is stored and assigned to a particular temperature.

Over a relatively long operating period with changes in the operating temperature of the angle sensor, the respective output signals for the zero point are stored for a plurality of temperatures. The stored values are then available for adjusting or calibrating the angle sensor for a particular operating temperature.

Reference signals for the zero point are preferably stored for predefined temperatures. When an output signal for a measured operating temperature is stored, the value for two predefined temperatures contained in the memory is then extrapolated. Conversely, when loading a value for the zero point, a value is interpolated using two values stored for predefined temperatures which are closest to the operating temperature. In this way, a very high level of accuracy is obtained despite a limited number of stored values.

According to the invention, it is recorded how often an output signal for a zero point has been stored for a particular temperature. In this case, when a new reference signal is calculated for this temperature, the stored value is used to a greater extent than an externally determined value the more often the value has already been stored for the particular temperature. The accuracy of the value is inferred from the number or frequency of the storage operations for a particular temperature. A newer, possibly more inaccurate measurement of the zero point is therefore used only to a limited extent in the formation of a new reference signal.

In order to be able to take into account the aging of the angle sensor, the influence of a stored value on the formation of a new reference value for the zero point is limited. Preferably, even with an infinite number of storage operations, the influence of an output signal stored for a particular temperature cannot exceed 70 to 90% when forming a new reference signal for the zero point.

According to another mode of the invention, signals are stored for the zero point of the angle sensor for a plurality of given temperatures, and, for the operating temperature, the reference signal is formed from a first signal stored for a first temperature lower than the operating temperature and from a second signal stored for a second temperature higher than the operating temperature.

According to yet another mode of the invention, the new reference signal for the operating temperature is converted back into a first signal for a first temperature lower than the operating temperature and a second signal for a second temperature higher than the operating temperature; and the first signal and the second signal are stored.

According to a further mode of the invention, a scaling factor for the angle sensor is formed based on the reference signal.

According to another mode of the invention, a gyroscope is used as the angle sensor.

According to yet another mode of the invention, signals for the zero point are stored for given temperatures during a manufacturing process.

With the objects of the invention in view there is also provided, a navigation system, including:

a processor;

an angle sensor connected to the processor for providing first data to the processor;

a distance sensor connected to the processor for providing second data to the processor;

a temperature sensor connected to the processor for measuring an operating temperature of the angle sensor;

a memory connected to the processor and storing a table for providing reference signals as calibration values for a zero point of the angle sensor for a plurality of given operating temperatures;

the processor being configured for determining a position from the first data from the angle sensor and from the second data from the distance sensor;

the processor being configured for generating, for the operating temperature, a reference signal from a first signal stored for a first temperature lower than the operating temperature and from a second signal stored for a second temperature higher than the operating temperature;

the angle sensor providing an output signal for the zero point, the output signal being measured at the operating temperature, the processor being configured for generating a new reference signal for the operating temperature from the reference signal and from the output signal for the zero point;

the processor converting the new reference signal formed for the operating temperature into a third signal for the first temperature and a fourth signal for the second temperature; and the memory storing the third signal and the fourth signal.

Other features which are considered as characteristic for the invention are set forth in the appended claims.

Although the invention is illustrated and described herein as embodied in a method for calibrating an angle sensor and a navigation system having an angle sensor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
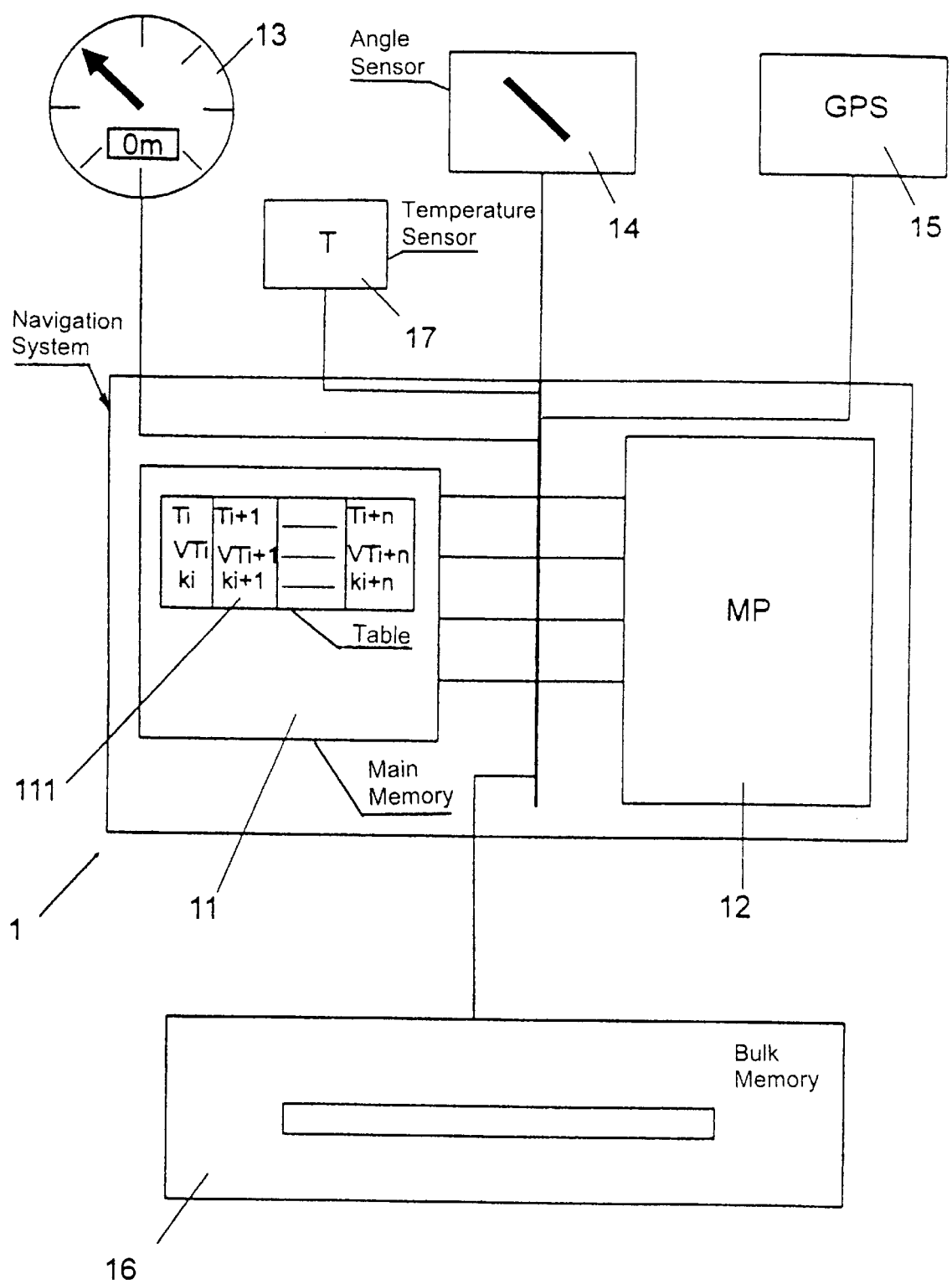
FIG. 1 is a block diagram of a navigation system according to the invention having an angle sensor.

Referring now to the figures of the drawings in detail and first, particularly, to FIG. 1 thereof, there is shown a navigation system 1 which is installed in a land vehicle. It has a nonvolatile main memory 11 which is a flash RAM (Random Access Memory).

The main memory 11 stores a plurality of temperature values $T_i$ to $T_{i+n}$. The lowest temperature value in the main memory is −30° C., and the highest temperature value is +80° C. The interval between adjacent temperature values $T_i$ and $T_{i+1}$ is 5° C.

For each temperature value $T_i$ to $T_{i+n}$, a reference signal $V_{Ti}$ to $V_{Ti+n}$ is stored for the zero point of an angle sensor 14. The angle sensor 14 is a gyroscope, which uses a piezoelectric crystal to measure the change in an angular velocity. In addition, a number $k_i$ to $k_{i+n}$ is stored for each of the reference signals $V_{Ti}$ to $V_{Ti+n}$, which are voltage values. This number represents the number of storage operations which have been used to store a new reference signal $V_{Tn}$ for the temperature concerned.

When the navigation equipment is manufactured, a standard reference signal is stored for each of the temperatures contained in the table 111. This standard reference signal may be the same for all the temperatures. The numbers $k_i$ to $k_{i+n}$ are each set to the value zero.

A microprocessor 12 is connected via a system bus to the main memory 11, to a distance meter 13, which is an odometer, to the angle sensor 14 and to an absolute position sensor 15, which is a GPS receiver, and also to a bulk memory 16, which is a CD-ROM (Compact Disc Read-Only Memory) drive.

Figure 2:
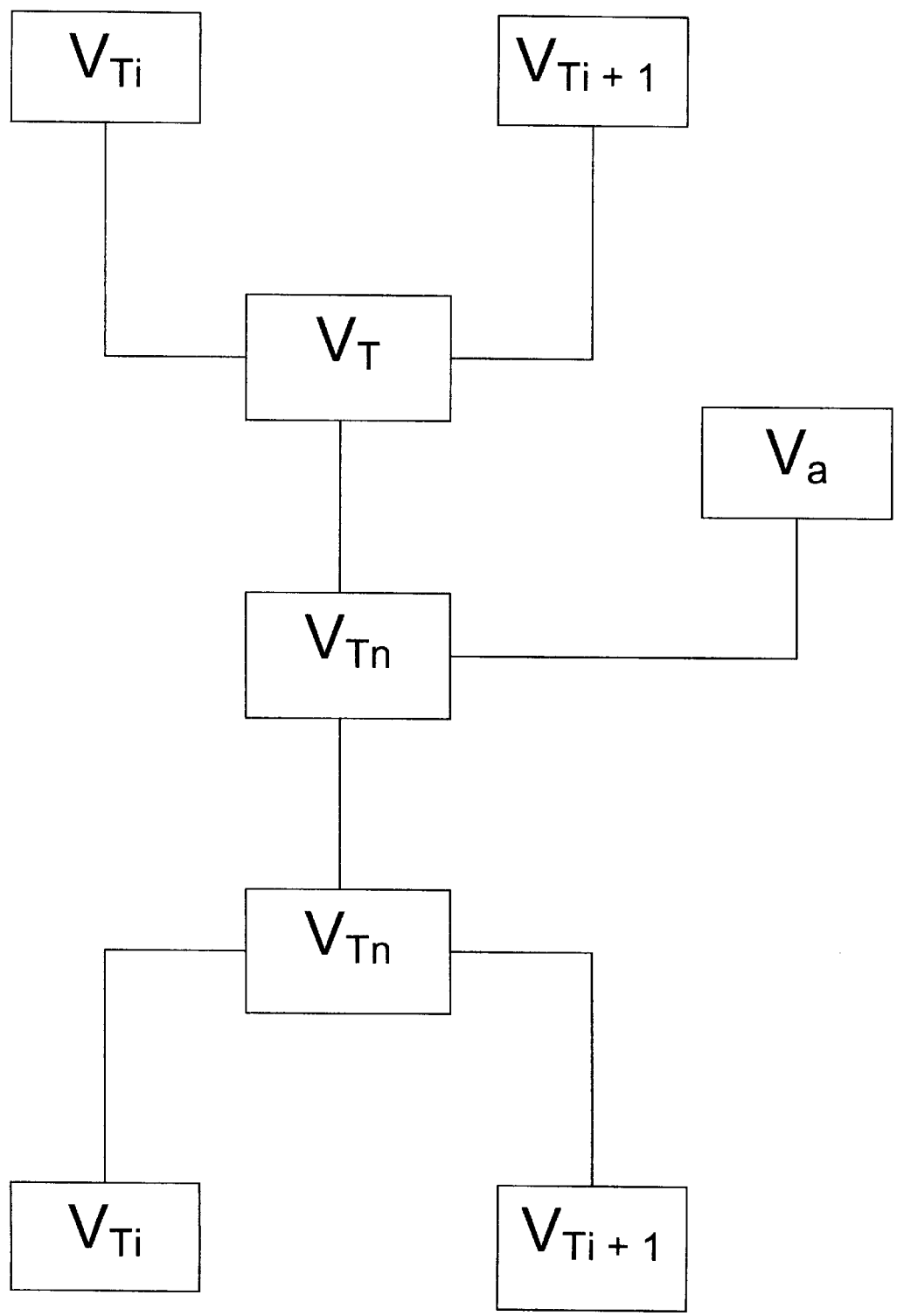
FIG. 2 is a flow chart illustrating steps of the method according to the invention.

FIG. 2 shows the operations which are to be carried out by the microprocessor 12. These operations result in reference signals for the zero point. The reference signals are stored for the angle sensor 14. The reference signals are determined on the basis of standard values, which are not tuned or adjusted to the properties of the individual angle sensor. A respective one of the reference signals is determined for a respective one of the stored temperatures, such that a given reference signal is characteristic of a given temperature and a specific angle sensor.

For an operating temperature T measured by the temperature sensor 17, those temperature values which are closest to the operating temperature T are sought in the main memory. These closest temperature values are a temperature $T_i$, which is lower than the operating temperature T, and a temperature $T_{i+1}$, which is higher than the operating temperature T.

For a measured operating temperature of 17.1° C., a temperature of 15° C. and a temperature of 20° C. can be found in the table in the main memory.

The reference signals $V_{Ti}$ and $V_{Ti+1}$ associated with these temperature values are read from the table in the main memory. A value $V_{Ti}$ of 2.50 volts is stored for the temperature $T_i$ of 15° C., and a value $V_{Ti+1}$ of 2.56 volts is stored for the temperature $T_{i+1}$ of 20° C.

These values are used to determine an interpolated reference signal $V_T$ for the measured temperature of 17.1° C. on the basis of the formula:

$$V_T = a*V_{Ti} + b*V_{Ti+1},$$

where $$b \equiv \left(\frac{T-T_i}{T_{i+1}-T_i}\right) \text{ and } a = 1-b.$$

Hence, a value of 0.42 is obtained for b, a value of 0.58 is obtained for a and a value of 2.53 volts is obtained for $V_T$.

This reference signal $V_T$ for an angle of 0° is used directly to scale the angle sensor if no other output signal is available for the zero point.

If, on the other hand, there is an additional output signal $V_a$ available, a new reference signal is formed for this measured operating temperature T of 17.1° C., is used to scale the angle sensor and is stored in the main memory. The following text assumes that the GPS receiver has determined that a vehicle travels on a straight road and that the signal $V_a$ measured by the angle sensor is 2.58 volts.

Since neither the output signal $V_a$ nor the reference signal $V_T$ obtained from the main memory can claim absolute accuracy, a new reference signal $V_{Tn}$ is obtained from the two variables. To this end, the signals $V_a$ and $V_T$ are weighted in relation to one another. In this context, it is assumed that the signal $V_T$ obtained from the main memory is more accurate the more often it has already been calculated and stored back into the memory. Similarly, it is possible to take into account whether a plurality of measurements have been carried out to form the output signal $V_a$.

In the exemplary embodiment, the number of storage operations already performed at the temperature $T_i$ of 15° C. is assumed to be $k_i=25$ and the number of storage operations at the temperature $T_{i+1}$ of 20° C. is assumed to be $k_{i+1}=30$. This gives the number k=27.1 for the formula $$k = a*k_i + b*k_{i+1}$$

with the values determined above for a and b.

Assuming that the influence of the reference value $V_T$ is not meant to be greater than 80% for the calculation of a new reference value $V_{Tn}$, the new reference value can be calculated as follows:

$$V_T = y*V_a + z*V_T,$$

where $$z = 0.8*\left(\frac{k}{1+k}\right)^6 \text{ and } y = 1-z.$$

On the basis of this formula, this gives z=0.64; y=0.36 and $V_{Tn}$=2.55 volts.

This value of 2.55 V, which defines the zero point of the sensor at 17° C., can now be used for calibrating and scaling the angle sensor. In addition, this new reference signal is extrapolated and values obtained therefrom for the temperatures $T_i$ of 15° C. and $T_{i+1}$ of 20° C. are stored. The new values are obtained from $$V_{Ti} = \frac{V_{Ti}*V_{Tn}}{V_T} \text{ and } V_{Ti+1} = \frac{V_{Ti+1}*V_{Tn}}{V_T}$$

as 2.52 volts and 2.58 volts.

Similarly, the number of storage operations k, whose value had been interpolated from $k_i$ and $k_{i+1}$, is incremented by one and is extrapolated again. This can be done on the basis of the following formula:

$$k_i = \frac{k_i(k+1)}{k} \text{ and } k_{i+1} = \frac{k_{i+1}(k+1)}{k}$$

Although the invention has been explained in relation to the individual calculation steps using just one algorithm in each case for illustrative purposes, it is clear that a plurality of algorithms may be used to implement the invention and, in

I claim:

1. A method for calibrating an angle sensor influenced by an operating temperature, the method which comprises:
    ascertaining an output signal for a zero point of an angle sensor and measuring an operating temperature associated with the angle sensor;
    forming a new reference signal from the output signal and from a reference signal for the zero point provided for the operating temperature;
    storing the new reference signal;
    recording a respective number indicating how often storage operations for reference signals have been performed for each of a plurality of temperatures;
    determining an influence of the reference signal for the zero point stored for a given temperature on a formation of the new reference signal based on the respective number indicating how often the storage operations have been performed; and
    setting the zero point of the angle sensor by using the new reference signal.

2. The method according to claim 1, which comprises:
    storing signals for the zero point of the angle sensor for a plurality of given temperatures; and
    forming, for the operating temperature, the reference signal from a first signal stored for a first temperature lower than the operating temperature and from a second signal stored for a second temperature higher than the operating temperature.

3. The method according to claim 1, which comprises:
    converting the new reference signal for the operating temperature back into a first signal for a first temperature lower than the operating temperature and a second signal for a second temperature higher than the operating temperature; and
    storing the first signal and the second signal.

4. The method according to claim 1, which comprises forming a scaling factor for the angle sensor based on the reference signal.

5. The method according to claim 1, which comprises using a gyroscope as the angle sensor.

6. The method according to claim 1, which comprises storing, during a manufacturing process, signals for the zero point for given temperatures.

7. A navigation system, comprising:

a processor;

an angle sensor connected to said processor for providing first data to said processor;

a distance sensor connected to said processor for providing second data to said processor;

a temperature sensor connected to said processor for measuring an operating temperature of said angle sensor;

a memory connected to said processor and storing a table for providing reference signals as calibration values for a zero point of the angle sensor for a plurality of given operating temperatures;

said processor being configured for determining a position from the first data from said angle sensor and from the second data from said distance sensor;

said processor being configured for generating, for the operating temperature, a reference signal from a first signal stored for a first temperature lower than the operating temperature and from a second signal stored for a second temperature higher than the operating temperature;

said angle sensor providing an output signal for the zero point, the output signal being measured at the operating temperature, said processor being configured for generating a new reference signal for the operating temperature from the reference signal and from the output signal for the zero point;

said processor converting the new reference signal formed for the operating temperature into a third signal for the first temperature and a fourth signal for the second temperature; and said memory storing the third signal and the fourth signal.

* * * * *